(12) United States Patent
Howley et al.

(10) Patent No.: US 11,841,223 B2
(45) Date of Patent: Dec. 12, 2023

(54) OPTICAL SYSTEMS WITH CONTROLLED MIRROR ARRANGEMENTS

(71) Applicant: LOCKHEED MARTIN CORPORATION, Bethesda, MD (US)

(72) Inventors: Brian James Howley, Mountain View, CA (US); Michael L Tartaglia, Berthoud, CO (US); Anthony C. Kowalczyk, San Mateo, CA (US); Patrick Eliott Perkins, Carmel Valley, CA (US); Alain Charles Carrier, La Jolla, CA (US); Paul J. Suni, Berthoud, CO (US); Bruce G. Tiemann, Longmont, CO (US); David Carl Sadighi, Boulder, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 1 day.

(21) Appl. No.: 17/678,978

(22) Filed: Feb. 23, 2022

(65) Prior Publication Data
US 2023/0266116 A1    Aug. 24, 2023

(51) Int. Cl.
*G01B 9/02015* (2022.01)
*G01B 9/02003* (2022.01)
*G01B 9/02* (2022.01)

(52) U.S. Cl.
CPC ..... *G01B 9/02016* (2013.01); *G01B 9/02003* (2013.01); *G01B 9/02024* (2013.01); *G01B 9/02029* (2013.01); *G01B 9/02051* (2013.01)

(58) Field of Classification Search
CPC ............ G01B 9/02002; G01B 9/02003; G01B 9/02016; G01B 9/02029; G01B 9/0203; G01B 9/02051
See application file for complete search history.

(56) References Cited

U.S. PATENT DOCUMENTS

| | | | | |
|---|---|---|---|---|
| 5,187,545 | A | * | 2/1993 | Allgauer ............ G01B 9/02051 356/482 |
| 5,359,415 | A | * | 10/1994 | Tabarelli ............ G01B 9/02058 356/482 |
| 6,856,437 | B2 | | 2/2005 | Witt et al. |
| 6,947,621 | B2 | | 9/2005 | Bell, Jr. et al. |
| 7,003,186 | B2 | | 2/2006 | Bell, Jr. et al. |
| 7,188,961 | B2 | | 3/2007 | Sawayama et al. |

(Continued)

FOREIGN PATENT DOCUMENTS

WO    WO9206353    *    4/1992

*Primary Examiner* — Michael A Lyons
(74) *Attorney, Agent, or Firm* — BAKERHOSTETLER

(57) ABSTRACT

An optical system can include a mirror that reflects incoming light to a sensor for detection. The position and/or orientation of the mirror can be controlled to reflect incoming light from different locations and/or directions. Position and/or orientation of the mirror may be tracked and/or detected by an optical position sensor. The position sensor can transmit a beam to a reflector on the mirror, and the reflected beam can be received by the position sensor. Characteristics of the reflected beam can be measured to determine the position and/or orientation of the mirror. For example, the beam can be used for interferometric and/or intensity measurements, which can then be correlated with a position and/or orientation of the mirror.

20 Claims, 8 Drawing Sheets

(56) References Cited

U.S. PATENT DOCUMENTS

| | | | |
|---|---|---|---|
| 2008/0170232 A1* | 7/2008 | Buijs .......................... | G01J 3/02 |
| | | | 356/455 |
| 2009/0097144 A1 | 4/2009 | Oehlke et al. | |
| 2018/0364431 A1* | 12/2018 | Zhao .................. | G01B 9/02003 |
| 2022/0187055 A1* | 6/2022 | Kendrick ........... | G01B 9/02044 |

* cited by examiner

OPTICAL SYSTEMS WITH CONTROLLED MIRROR ARRANGEMENTS

STATEMENT REGARDING FEDERALLY SPONSORED RESEARCH OR DEVELOPMENT

Not applicable.

TECHNICAL FIELD

The present description relates in general to optical systems, and more particularly to, for example, without limitation, optical systems with controlled mirror arrangements.

BACKGROUND OF THE DISCLOSURE

Optical systems can include mirrors that are operable to be adjusted with angular positions about, for example, two mutually perpendicular axes. Such a mirror can be mounted on a support for pivoting about such axes by means of a universal joint, and a plurality of actuators that are circumferentially distributed at or close to the periphery of the mirror is being used to adjust the spatial position of the mirror relative to the support. The mirror can accordingly be steered to reflect an image for capture by a sensor. By reflecting the light with a controlled mirror, the direction of the view corresponding to the image can be controllably selected.

The description provided in the background section should not be assumed to be prior art merely because it is mentioned in or associated with the background section. The background section may include information that describes one or more aspects of the subject technology.

Figure 1:
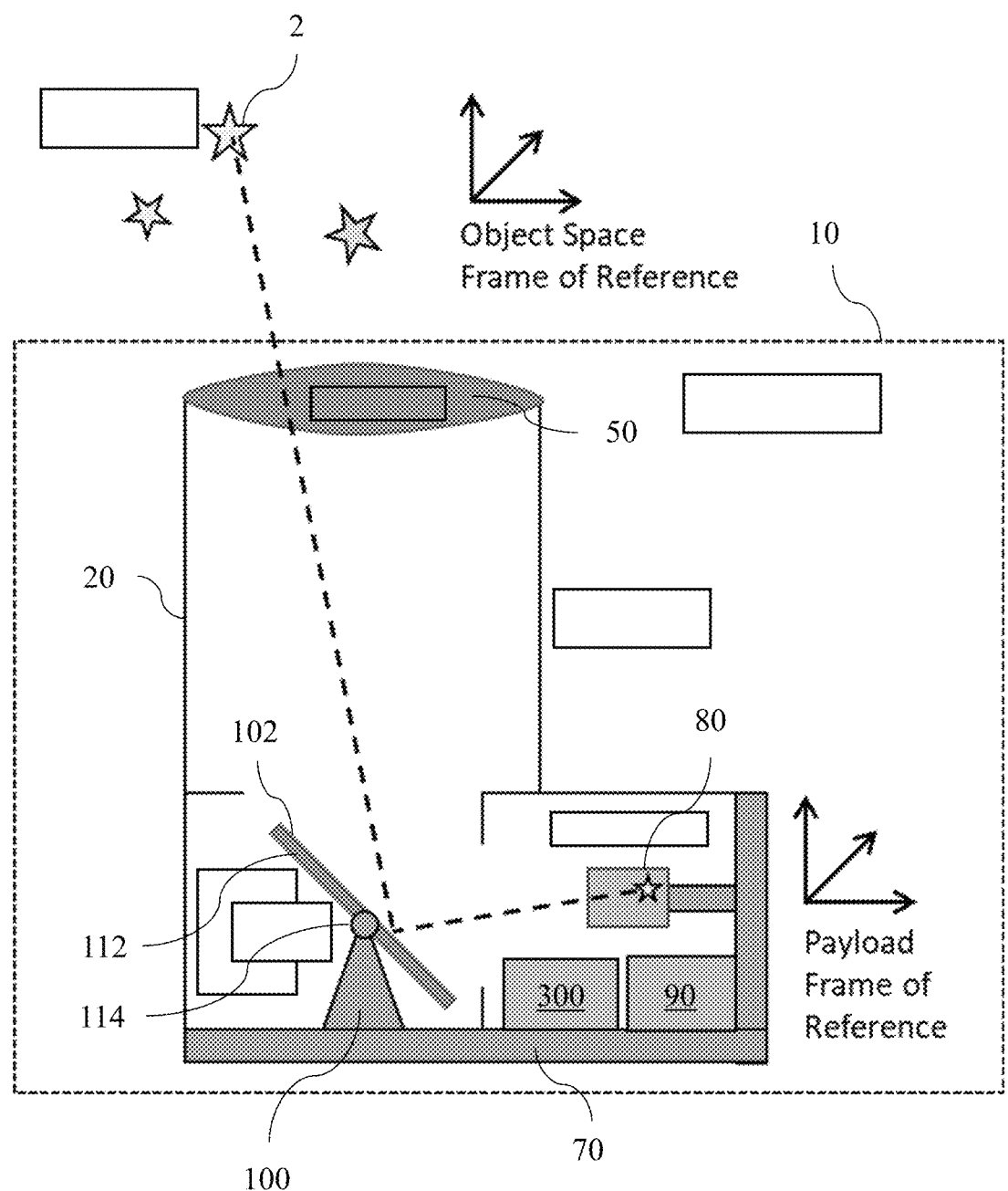
FIG. 1 illustrates a schematic view of a payload with an optical system.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Optical systems, including those included with a spacecraft or other payload, can include mirrors that are operable to be adjusted with angular positions about, for example, two mutually perpendicular axes. Examples of such mirrors can include fast steering mirrors. These mirrors can be mounted on a support for pivoting about such axes by means of a universal joint or flexure or gimbal, and a plurality of actuators that are circumferentially distributed at or close to the periphery of the mirror used to adjust the spatial position of the mirror relative to the support. The mirror can accordingly be steered to reflect an image for capture by a sensor. By reflecting the light with a controlled mirror, the direction of the view corresponding to the image can be controllably selected.

As such images are captured and recorded, it can be useful to know the position and/or orientation of the mirror so that the direction of the view being captured in the image can be determined. Information regarding the position and/or orientation of the mirror can further be used to control and/or adjust the mirror.

Traditional means for determining the position and orientation of a fast-steering mirror include non-contact sensors such as inductive or capacitive sensors arranged in a way such that the electrical signals from these sensors change as a function of the mirror position or orientation. Disadvantages of these sensors include limited dynamic range and measurement non-linearities that are difficult to calibrate or correct, particularly over large ranges of motion. Conversely, optical sensors, in particular interferometric optical sensors, can offer advantages in dynamic range and linearity, but typically measure only changes in position or orientation from an initial start. If the starting position and orientation of the mirror is known, then tracking the change in position using an optical sensor provides the equivalent information as inductive or capacitive sensors but with the advantages of higher dynamic range and improved linearity. Alternatively, optical sensors can measure relative position by using either optical gratings or encoders or by using interferometric measurements over multiple wavelengths of light to eliminate the uncertainty of the mirror starting position. However, for steering mirrors with angular motion in more than one direction grating or encoder-based systems can operate only over limited ranges. Interferometric measurement over multiple optical wavelengths is less constrained but the additional electro-optics required to achieve the desired accuracy is highly costly.

The present disclosure relates to optical position sensors, including interferometric sensors. Some interferometric sensors provide displacement information relative to a reference position, rather than direct position and/or angle information. If the reference position for a displacement sensor is lost (e.g., due to power reset), then it must be re-established, such as by determining the alignment with respect to known objects (e.g., stars). Such a re-calibration can be a significant operational disruption and may not be practical in some situations. Additionally, many sensors are subject to scale factor errors which must be periodically calibrated and corrected. The present disclosure provides an internal means to quickly re-establish mirror position sensor reference and scale factor error correction. This reduces the operational impact associated with re-calibration.

Referring now to FIG. 1, a payload 10, which may be mounted on a spacecraft, or aircraft or other platform, can include an optical system 20 for capturing images of one or more objects 2. The optical system 20 can include a mirror device 100 that receives incoming lights from the object to and reflects the incoming light to a sensor 80 of the optical system 20. The incoming light can optionally pass through an optical element 50, such as a lens, grating, and/or aperture. It will be understood that any number of other optical elements can be provided along an optical pathway leading to the sensor 80. The sensor 80 can capture an image and/or record other data associated with the incoming light as reflected by the mirror device 100.

The payload 10 and/or the optical system 20 can include an inertial measurement unit ("IMU") 90, along with any number and type of other sensors. The IMU 90 can provide information regarding a characteristic of the payload 10 and/or the optical system 20, such as inertial angles thereof. For example, the IMU 90 can include a six-degrees of freedom IMU that calculates the position, velocity, and/or acceleration of the payload 10 in translation and orientation. The IMU 90 can include one or more accelerometers, and/or gyroscopes, or other inertial sensors. The IMU 90 can be augmented with other sensors (eg magnetometers or star trackers (not shown in FIG. 1)) to determine the position and/or orientation of the payload 10 with respect to its environment and/or objects (e.g., objects 2).

The mirror device 100 can provide a reflective surface 102 on one side of a plate 112. The plate 112 can be controllably rotated about and/or otherwise move with respect to a pivot 114. For example, the plate 112 can rotate about multiple (e.g., two) axes that extend through the pivot 114. The plate 112 be moved with one or more of a variety of mechanisms, including linear actuators, piezo actuators, magnetic actuators, voice coils, servo amplifiers, magnet supports, motor assemblies, and the like. A computer and optical-electronic system 300 can be provided in operable communication with the mirror device 100 to determine the orientation and/or track movement of the plate 112. From the knowledge of the orientation or motion of plate 112 provided by the computer and optical-electronic system 300, the orientation and motion of the mirror can be controlled as desired.

Figure 2:
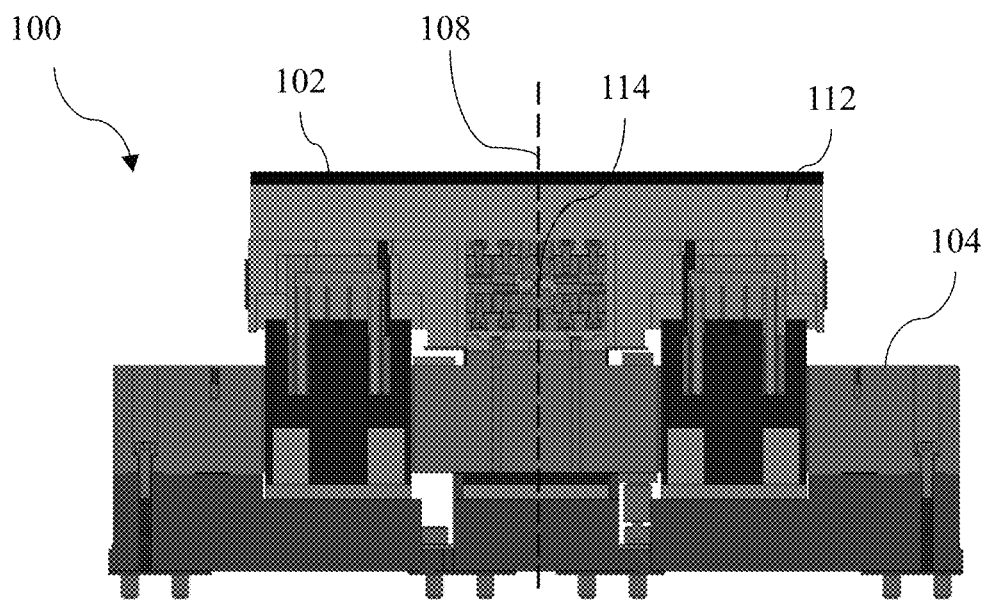
FIG. 2 illustrates a sectional view of a mirror device of the optical system of FIG. 1.
Figure 3:
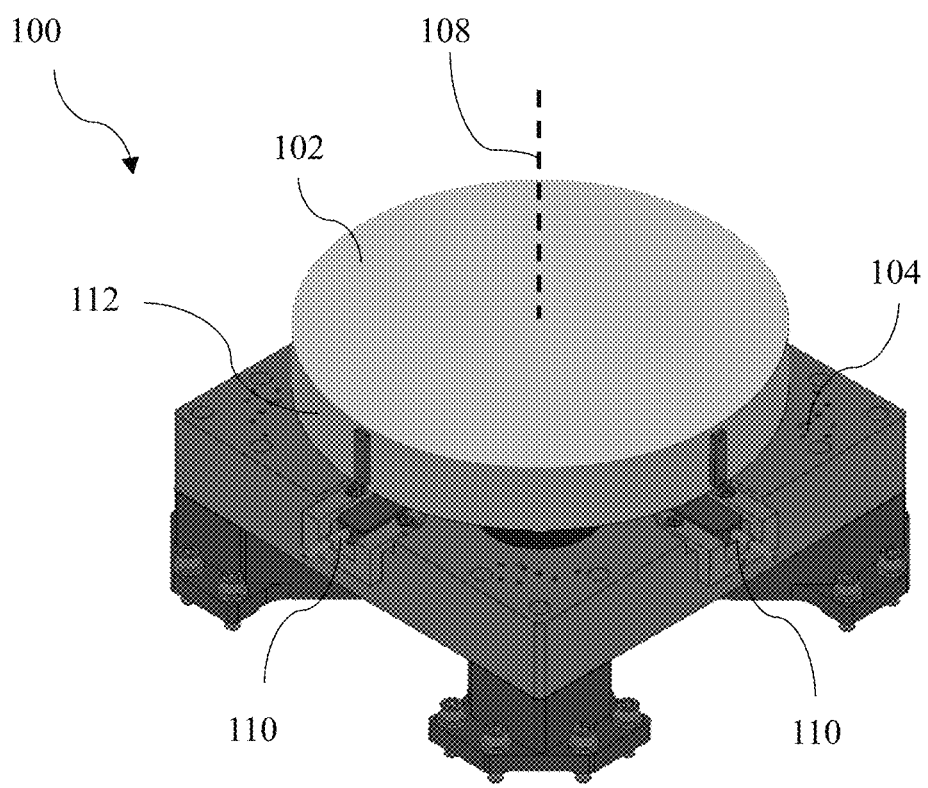
FIG. 3 illustrates a perspective view of a portion of the mirror device of FIG. 2.

Referring now to FIGS. 2 and 3, a mirror device 100 can include components that facilitate tracking the position and/or orientation thereof. For example, as shown in FIG. 2, the mirror device 100 can include a reflective surface 102 on a first side of the plate 112, which can be positioned on a first side of the support 104. The support 104 can be a center plate that provides engagement with a pivot 114. In some embodiments, certain portions of the mirror device 100 can move with respect to other portions of the mirror device 100. For example, the plate 112 can move and/or rotate about the pivot 114 and with respect to the support 104. The pivot 114 can be located at a central axis 108 extending through the mirror device 100, the plate 112, and/or the reflective surface 102. Such movements can change an angle of the plate 112 with respect to the support 104, as well as to direct incoming light as desired within the optical system (see FIG. 1).

As shown in FIG. 3, the mirror device 100 can include position sensing systems 110 and/or portions thereof at an interior portion. For example, a perspective view of the mirror device 100 of FIG. 3 is shown with portions of position sensing systems 110 mounted to the center plate 104. Portions of position sensing systems 110 are likewise mounted underneath the plate 112 and are not visible in the perspective in FIG. 3. It will be understood that some portions of the position sensing system 110 can be included at a particular location within the mirror device 100 (e.g., on the support 104), and other portions of the position sensing system 110 can be included elsewhere on the mirror device 100 (e.g., at the plate 112), such that interaction between the different portions facilitates the desired determinations, as described further herein. For example, while the support 104 can remain stationary, the movements of the plate 112 can be detected by interactions managed by the position sensing systems 110, as described further herein. As shown in FIG. 3, multiple position sensing systems 110 can be included with the mirror device 100. For example, position sensing systems 110 can be provided in differential pairs to provide primary and redundant measurements of the position and/or orientation of the plate 112 and/or the reflective surface 102 thereof. As the plate 112 tilts with respect to the central axis 108, the position sensing systems 110 can detect such changes based on interactions with the plate 112. For example, position sensing systems 110 positioned on opposing sides of the central axis 108 can detect complementary and/or opposing changes (e.g., an increase on one side occurring during a decrease on the opposing side). By further example, position sensing systems 110 positioned on a same side of the central axis 108 can detect similar or matching changes to provide redundant measurements. The position sensing systems 110 can be distributed circumferentially at different locations about the central axis 108 to detect different types (e.g., directions) of tilt with respect to the central axis 108. For example, where the plate 112 is configured to tilt about 2 different axes (e.g., each being orthogonal to the central axis 108) at least two position sensing systems 110 can be positioned circumferentially displaced by 90° with respect to each other about the central axis 108. It will be understood that any number and/or arrangement of position sensing systems 110 can be provided to track and determine the movements of the mirror device 100.

Figure 4:
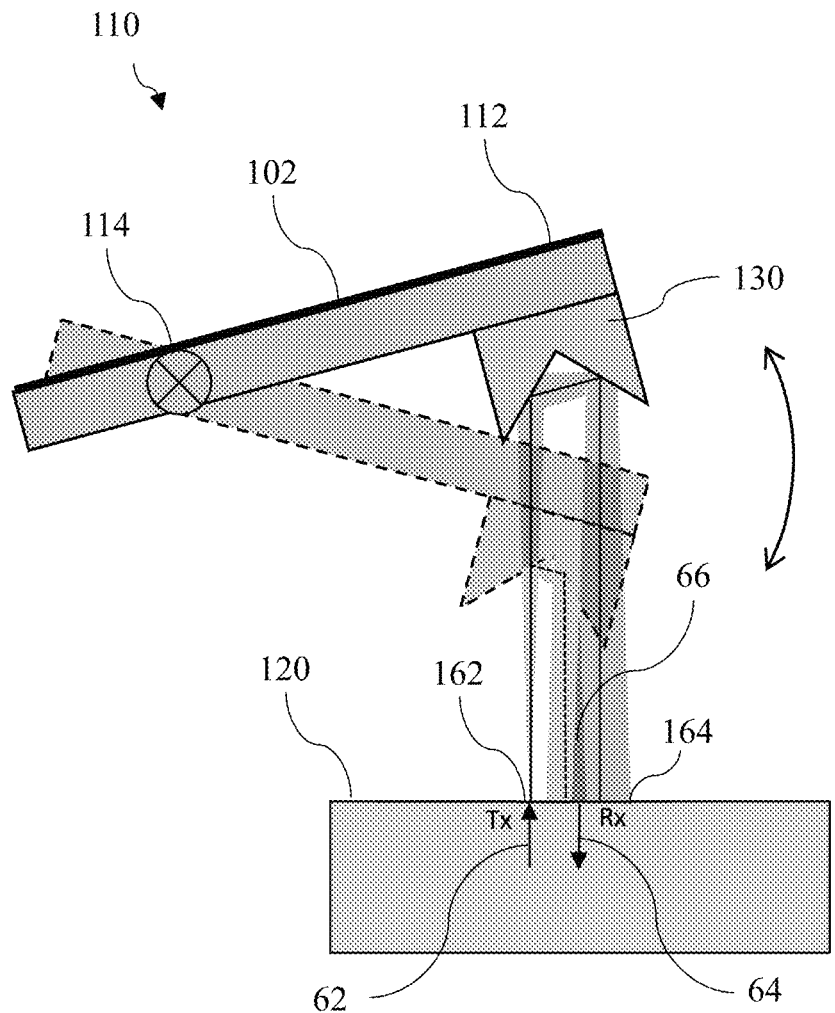
FIG. 4 illustrates a schematic view of a mirror device and a position sensor.

Referring now to FIG. 4, the position sensing systems of the mirror device can be operated to control motion and help to determine the location of the sensed objects and/or the direction of incoming light. As shown in FIG. 4, the position sensing system can include a position sensor 120 that interacts with a retroreflector 130 of a mirror device. The position sensor 120 can be mounted to a support, such as the support 104 of FIGS. 2 and 3, and the retroreflector 130 can be mounted to the plate 112 that further provides the reflective surface 102 and rotates about a pivot 114. It will be understood that, in some embodiments, the positions of the retroreflector 130 in the position sensor 120 can be swapped as desired.

As shown in FIG. 4, the position sensor 120 can include a transmit waveguide 162 for transmitting a transmit beam 62 (e.g., laser beam) toward the retroreflector 130. The position sensor 120 can further include a receive waveguide 164 for receiving a return beam 64 as a reflection of the transmit beam 62 from the retroreflector 130. It will be understood that the transmit waveguide 162 and/or the receive waveguide 164 can include or be accompanied by other optical elements, such as apertures, lenses, and the like.

As further shown in FIG. 4, as the plate 112 moves (e.g., rotates about the pivot 114), the retroreflector 130 can correspondingly move, such that the transmit beam 62 is reflected to a different portion of the position sensor 120. It will be understood that the transmit beam 62 can be transmitted such that it is directed to the retroreflector 130 across a range of its positions. While a transmit beam 62 of a given direction can reach the retroreflector 130, the position of the retroreflector 130 (i.e., based on the position of the plate 112) can alter the path of the return beam 64. For example, the return beam 64 can be reflected such that it reaches the position sensor 120 (e.g., at the receive waveguide 164) at a distinct position relative to the position corresponding to other positions of the retroreflector 130. By further example, the return beam 64 can be reflected such that it is parallel to the transmit beam 62 based on an arrangement of the retroreflector 130 as described further herein. Accordingly, the angle of the return beam 64 with respect to the position sensor 120 can be substantially consistent across a range of positions for the retroreflector 130. However, the pathway of the return beam 64 can vary for different positions of the retroreflector 130. As shown in FIG. 4, the transmit beam 62 can be provided as a diverging (i.e., in width) beam, such that the return beam 64 is also diverging. Where a range of paths for the return beam 64 are distinct from each other, the return beams 64 can nonetheless have a region of overlap 66. The receive waveguide 164 and/or corresponding optical elements (e.g., apertures, lenses, etc.) can be positioned at this region of overlap 66 to receive at least a portion of the return beam 64 regardless of the particular path resulting from reflection. The position sensor 120 can thereby detect the return beam 64 regardless of the portion of the receive waveguide 164 to which it is directed. The return beam 64 can then be analyzed to make a detection that can be correlated with a position of the retroreflector 130, thereby determining its current status.

Figure 5:
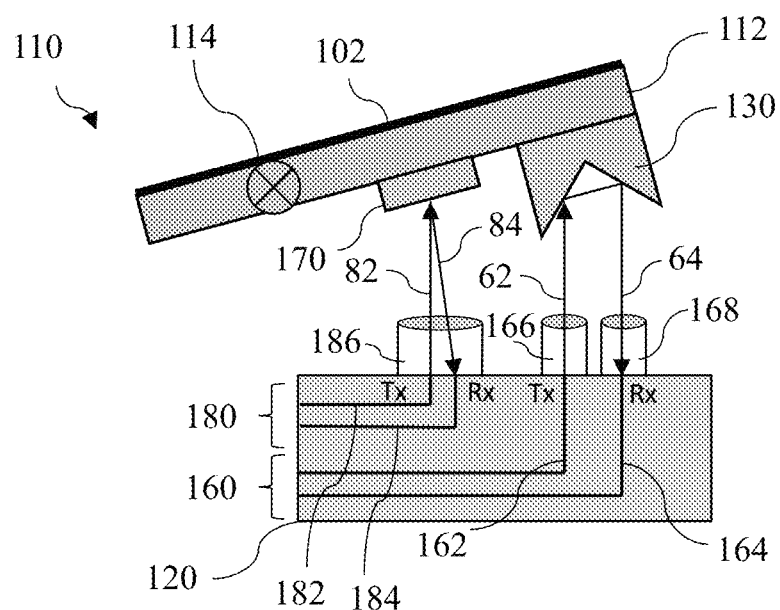
FIG. 5 illustrates a schematic view of a mirror device and a position sensor.
Figure 6:
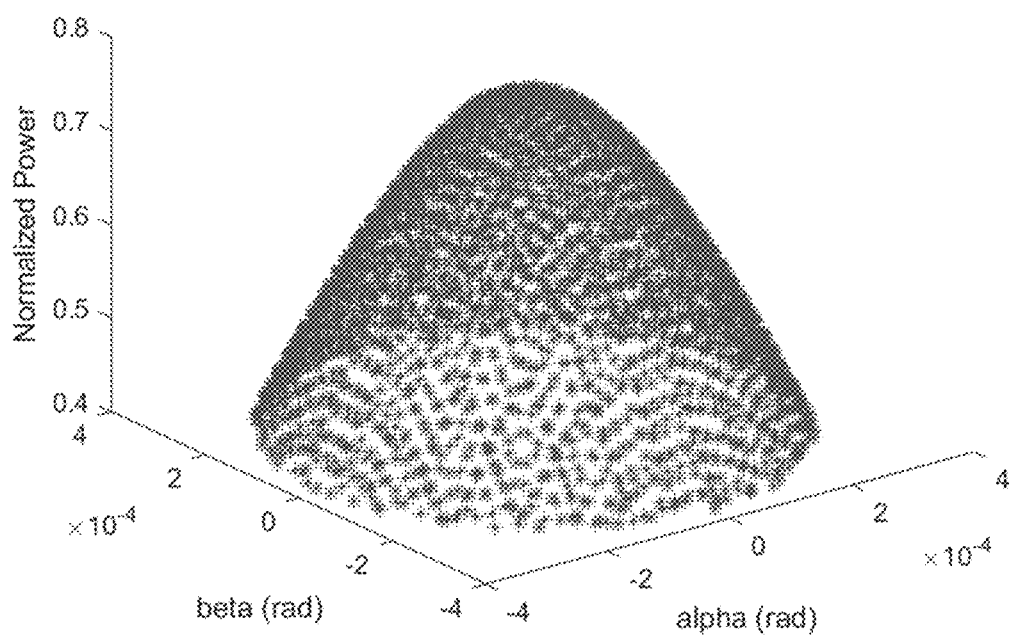
FIG. 6 illustrates a graph of detector intensities across various angles of a mirror device.

Referring now to FIGS. 5-6, additional or alternative types of optical position sensing can be performed to determine the position of a mirror device. As shown in FIG. 5, the plate 112 having a reflective surface 102 can rotate about a pivot 114 to control the direction of incoming light that is reflected by the reflective surface 102. The position sensing system 110 can include a retroreflector 130, as described herein. For example, the retroreflector 130 can be a corner cube reflector that is configured to reflect a return beam 64 in a direction that is approximately parallel to the direction of its incidence as a transmit beam 62. As used herein, two paths or beams are "approximately parallel" if they are exactly parallel or within 2° of parallel (e.g., at an intersection of the paths or beams, where applicable). In addition to or as a replacement for the waveguides, a transmit lens 166 can be included between the position sensor 120 (e.g., at an aperture and/or the transmit waveguide 162) and the retroreflector 130. Additionally or alternatively, a receive lens 168 can be included between the position sensor 120 (e.g., at an aperture and/or the receive waveguide 164) and the retroreflector 130. It will be understood that in certain configurations of the position sensor 120, the transmit and receive functions of lenses 166 and 168 may be combined into a single lens, while other configurations may include only a transmit lens 166, or only a receive lens 168, or neither lens. It will be further understood that in certain configurations additional optics to direct the transmit beam 62 or the return beam 64, such as fold or relay mirrors, may also be included. The transmit beam 62 can be generated by a displacement interferometer 160, and the return beam 64 can be received by the displacement interferometer 160. The displacement interferometer 160 can compare the transmit beam 62 to the return beam 64 to determine a change in the path length from the aperture of the transmit waveguide 162 to the retroreflector 130 and back to aperture of the receive waveguide 164. Such a change in path length-can be correlated with a change in the position of the retroreflector 130 and an angle of the plate 112 and/or the reflective surface 102.

The result of measurements performed by the displacement interferometer 160 can be tracked by a computing system, further described here in. However, in the event of a temporary interruption of computing operations, such as a single event upset, tracking information may be lost and the position or orientation of the plate 112 must be re-established. Under these or similar circumstances, in some embodiments, it can be beneficial to have a second sensor to help re-establish mirror tracking information. Additionally, a second sensor in multiple position sensing systems 110 can be used to correct sensor measurement errors due to scale factor or bias uncertainties that may vary slowly over time.

As shown in FIG. 5, the position sensor 120 can include an angle reference sensor 180 that interacts with a flat reflector 170 of a mirror device. The flat reflector 170 can be mounted to the plate 112. It will be understood that, in some embodiments, the positions of the flat reflector 170 in the position sensor 120 can be swapped as desired. The position sensor 120 can include a transmit waveguide 182 for transmitting a transmit beam 82 (e.g., laser or other collimated light beam) toward the flat reflector 170. The position sensor 120 can further include a receive waveguide 184 for receiving a return beam 84 as a reflection of the transmit beam 82 from the flat reflector 170. In addition to or as a replacement for the waveguides, a lens 186 can be included between the position sensor 120 (e.g., at apertures, the transmit waveguide 182, and/or the receive waveguide 184) and the flat reflector 170. It will be understood that the transmit waveguide 182 and/or the receive waveguide 184 can include or be accompanied by other optical elements, such as apertures, lenses, and the like.

As further shown in FIG. 5, as the plate 112 moves (e.g., rotates about the pivot 114), the flat reflector 170 can correspondingly move, such that the transmit beam 82 is reflected to a different portion of the position sensor 120. It will be understood that the transmit beam 82 can be transmitted such that it is directed to the flat reflector 170 across a range of its positions. While a transmit beam 82 of a given direction can reach the flat reflector 170, the position of the flat reflector 170 (i.e., based on the position of the plate 112) can alter the path of the return beam 84. For example, the return beam 84 can be reflected at an angle that is dependent on the angle of the plate 112, such that the return beam 84 reaches the position sensor 120 (e.g., at the receive waveguide 184) at a distinct position relative to the position corresponding to other positions of the flat reflector 170.

The amount of light received by the receive waveguide 184 can vary with the angle, such that a peak intensity occurs at a specific position or orientation of the plate 112. For example, as shown in FIG. 6, the intensity, which can vary with the orientation of plate 112 in two directions, can reach a peak for a given pair of angles and diminish when the orientation of plate 112 moves away from those angles. Accordingly, the detections performed by the angle reference sensor 180 can be tracked to determine times at which peak signal intensity is measured. The optics system can then use the timing of peak signal intensities as a reference to calibrate the displacement interferometer 160. By further example, the angle at which maximum intensity occurs is consistent if the relationship between the transmit beam 82 and the pivot 114 is constant. The lens 186 can be configured to provide that changes in intensity correspond to change in the rotation about the pivot 114. In some embodiments, the same lens 186 is used for the transmit waveguide 182 and the receive waveguide 184 to eliminate one source of alignment drift. The lens 186, the transmit waveguide 182, and the receive waveguide 184 can maintain their relative alignments by being of materials that have matching coefficients of thermal expansion.

Figure 7:
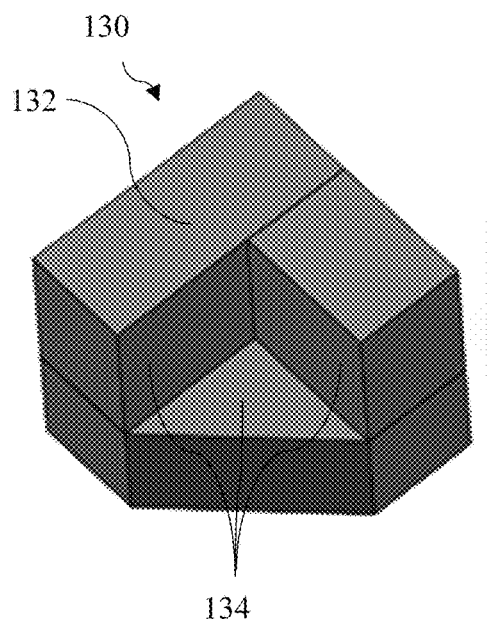
FIG. 7 illustrates a perspective view of a cubic corner reflector.
Figure 8:
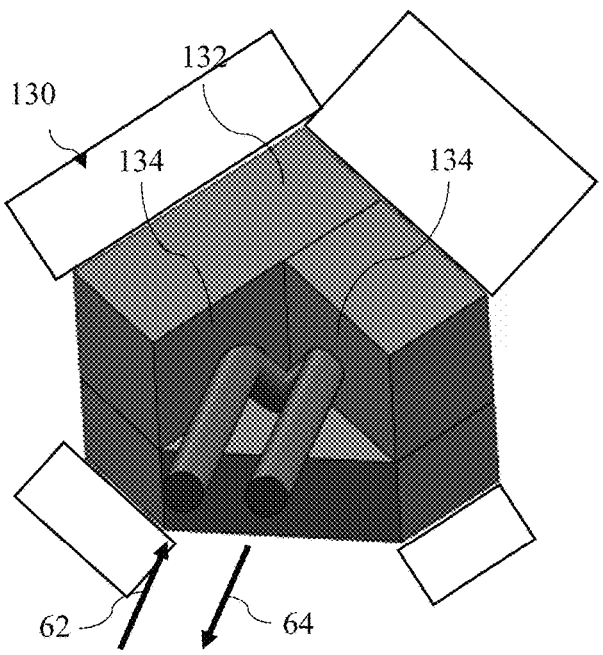
FIG. 8 illustrates another perspective view of the cubic corner reflector of FIG. 7.
Figure 9:
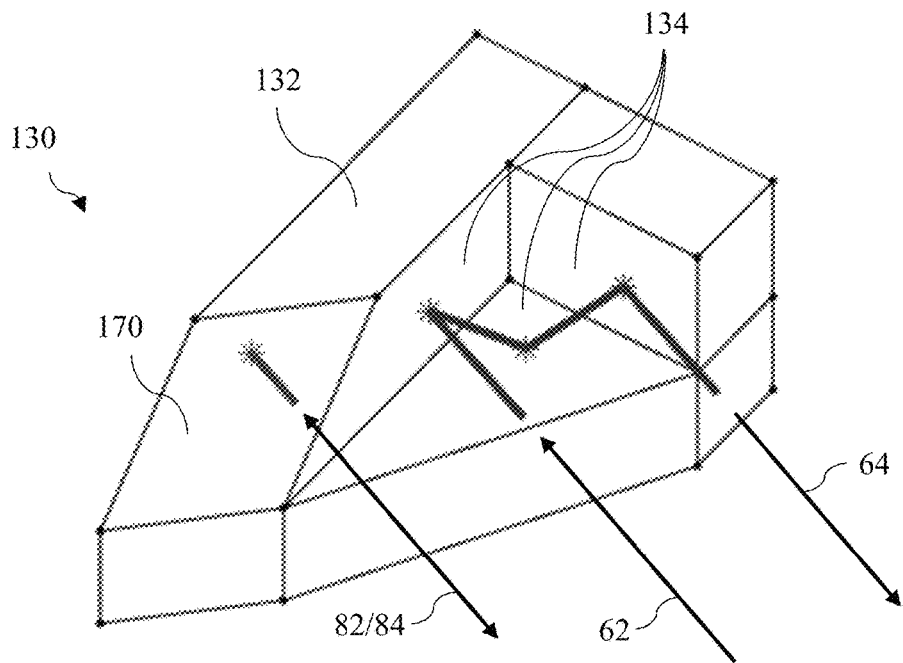
FIG. 9 illustrates a top view of a cubic corner reflector having a flat reflector.

Referring now to FIGS. 7-9, the reflectors of a mirror device can be provided with a construction to facilitate the measurements described herein. As shown in FIG. 7, the retroreflector 130 can be a corner cube reflector. The corner cube retroreflector 130 can include a structure 132 that forms at least two reflective surfaces 134. In the example of FIGS. 7 and 8, three reflective surfaces 134 are illustrated. The reflective surfaces 134 can each face inwardly towards a space at least partially bounded thereby. The reflective surfaces 134 can be mutually orthogonal to each other.

As shown in FIG. 8, the transmit beam 62 can be transmitted so as to be incident upon one of the reflective surfaces 134. The transmit beam 62 can sequentially reflect off of each of the three reflective surfaces 134. The resulting return beam 64 can be transmitted in a direction that is parallel to a direction of the transmit beam 62. Accordingly, the retroreflector 130 can reflect the beam to a generally consistent location on a position sensor.

As shown in FIG. 9, the retroreflector 130 can include the structure 132 that is monolithic with the structure that forms the flat reflector 170. As used herein, a monolithic structure is one that is integrally formed of a single piece of material, rather than of separate pieces that are joined together by an interface. By providing a monolithic, unitary, and/or unibody body, the each of the bodies does not contain interfaces or discontinuities therein, such as those that occur in assembled parts. Accordingly, the monolithic, unitary, and/or unibody body can be fabricated to more precise and consistent dimensions and have more consistent alignment through different thermal conditions.

For example, an end of the structure 132 can be shaped to form the flat reflector 170. As such, the transmit beam 62 can be directed to the reflective surfaces 134, while the transmit beam 82 can be directed to the flat reflector 170. The return beam 64 can, across a range of orientations for the retroreflector 130, be reflected in a direction that is parallel to the direction of the transmit beam 62. In contrast, the return beam 84 can be reflected in a direction that is dependent on the orientation of the flat reflector 170. By providing a monolithic structure 132, the corner cube retroreflector 130 and the flat reflector 170 can maintain a consistent relative alignment and provide enhanced thermal stability. Additionally or alternatively, the flat reflector 170 can otherwise be coupled together in a manner that maintains a consistent position and/or orientation with respect to the corner cube retroreflector 130 across of range of motion for both.

Figure 10:
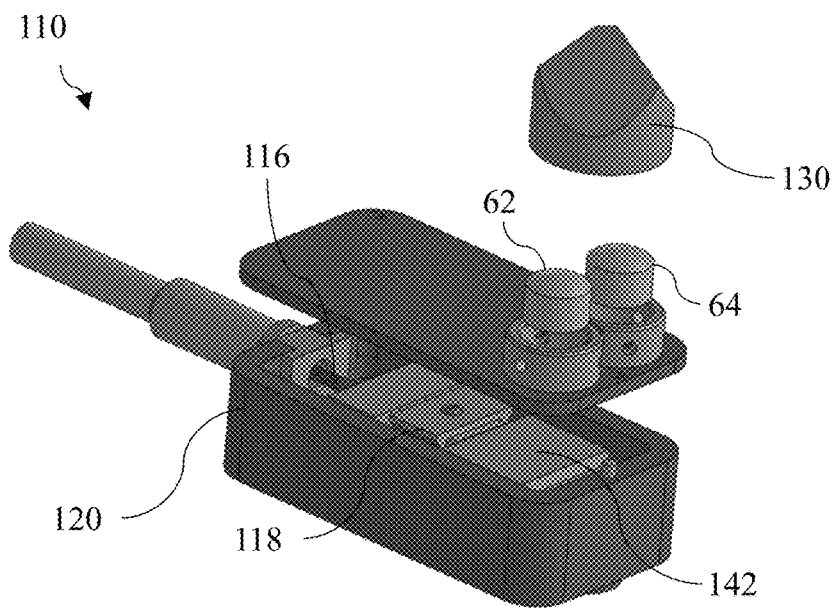
FIG. 10 illustrates a position sensor having a photonic integrated circuit.
Figure 11:
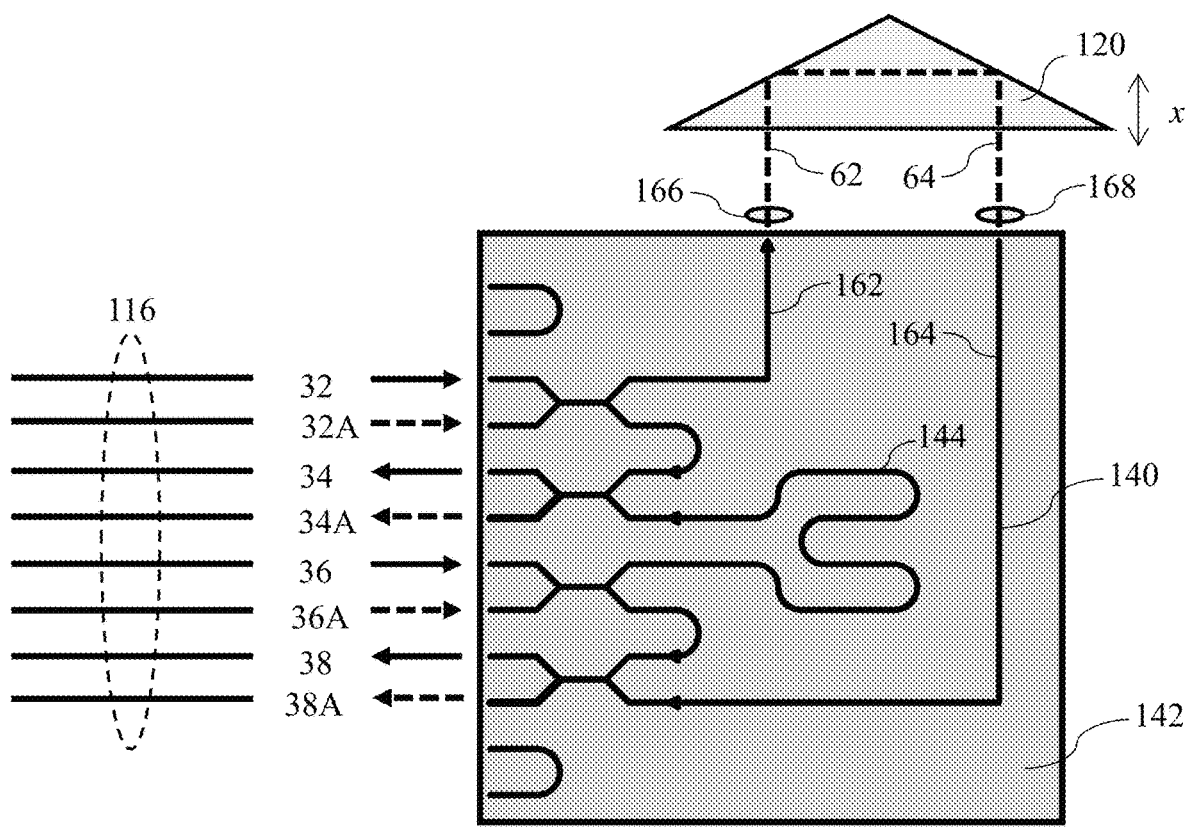
FIG. 11 illustrates a diagram of the position sensor of FIG. 10.

Referring now to FIGS. 10 and 11, a position sensor 120 of a position sensing system can be provided with components that facilitate transmission, receipt, and measurement of beams described herein. As shown in FIG. 10, the position sensor 120 can include a photonic integrated circuit ("PIC"), a planar lightwave circuit ("PLC"), or a lightwave integrated optic ("LIO"). The PIC 142 can include or be connected to optical fibers 116, aligned and supported by adaptor fixture 118, for example a V-groove assembly, as needed. The PIC 142 can further include or be connected to a transmit waveguide 162 for transmitting the transmit beam 62 and/or a receive waveguide 164 for receiving the return beam 64. Such beams can be directed to and reflected by a corner cube reflector. While other beams and waveguides are not illustrated, it will be understood that any number of waveguides and/or other optical elements can be provided for transmitting and/or receiving other beams, including beams directed to and reflected by a flat reflector for angle reference measurements. Additionally or alternatively, a separate position sensor 120 or module thereof can be provided for transmission and receipt of other beams. The position sensor 120 can further include a thermistor or other temperatures sensitive elements for detecting and/or reacting to thermal conditions of the position sensor 120.

As shown in FIG. 11, the PIC 142 can include optical waveguides with one or more of waveguide bends, waveguide crossings, waveguide couplers, and waveguide splitters. In the illustrated example, the PIC 142 receives as inputs via optical fibers 116 an input signal 32, as well as a local oscillator signal 36. The local oscillator signal 36 can be an optical signal with a different frequency than the input signal 32 to enable a heterodyne measurement. Alternatively, or additionally, the local oscillator signal may be phase modulated to enable homodyne measurement. The PIC 142 provides as outputs an output reference signal 34 and a measurement signal 38. These outputs can be conveyed to an electro-optical computing system via optical fibers 116. By providing the transmit beam 62 with the transmit waveguide 162 and receiving the return beam 64 with the transmit waveguide 164, the photonic integrated circuit 142 can perform interferometric mixing of the return beam 34 with the local oscillator 36 to provide a heterodyne measurement. Additionally, the PIC 142 can provide additional waveguides, waveguide couplers, and waveguide splitters to provide a separate heterodyne measurement signal, 39, between the input signal 32 and the local oscillator 36 to calibrate out any thermal error from the PIC itself. A path length matching waveguide 144 can be provided so that the total path lengths to and from the transmit waveguide 162 and the receive waveguide 164 (e.g., at ends or apertures thereof) are substantially equal. While some of the return beam 64 can be incident on the receive waveguide 164, other portions of the return beam 64 can scatter into the PIC, which can degrade the precision of the interferometric mixed signal. The mode stripper waveguide 140 can optionally include a tortuous and/or curved path to clean the optical modes that are propagating in the 164 to improve the quality of the interferometric measurement. Additionally, the PIC 142 can provide additional waveguides, waveguide splitters, and waveguide couplers to accommodate redundant sources for input signal 32A and input local oscillator 36A and redundant returns for the measurement signal 38A and the reference signal 34A.

It will be understood that the PIC 142 in FIG. 11 includes not only waveguides, waveguide couplers, and waveguide splitters, but may also include other optical devices such as mode transformers and/or lenslets for efficiently coupling the light in the waveguides to or from optical fibers or to or from free space as, for example, to launch the transmit beam 62 or accept the receive beam 64. It will be further understood that in certain embodiments, PIC 142 in FIG. 11 will include additional waveguides, waveguide splitters, and waveguide couplers to accommodate additional transmit and receive apertures, such as, for example, the angular reference sensor 180 depicted in FIG. 5. Additionally, in certain embodiments, the PIC 142 may have thermistors and/or small heater elements embedded within or mounted on the surface or near the PIC to control temperature. It will be further understood that PIC 142 could include embedded light sources or embedded optical detectors. Embedded light sources or detectors would replace one or more of the optical fiber interfaces depicted in FIG. 11 with electrical interfaces for supplying power or transducing electrical signals.

Figure 12:
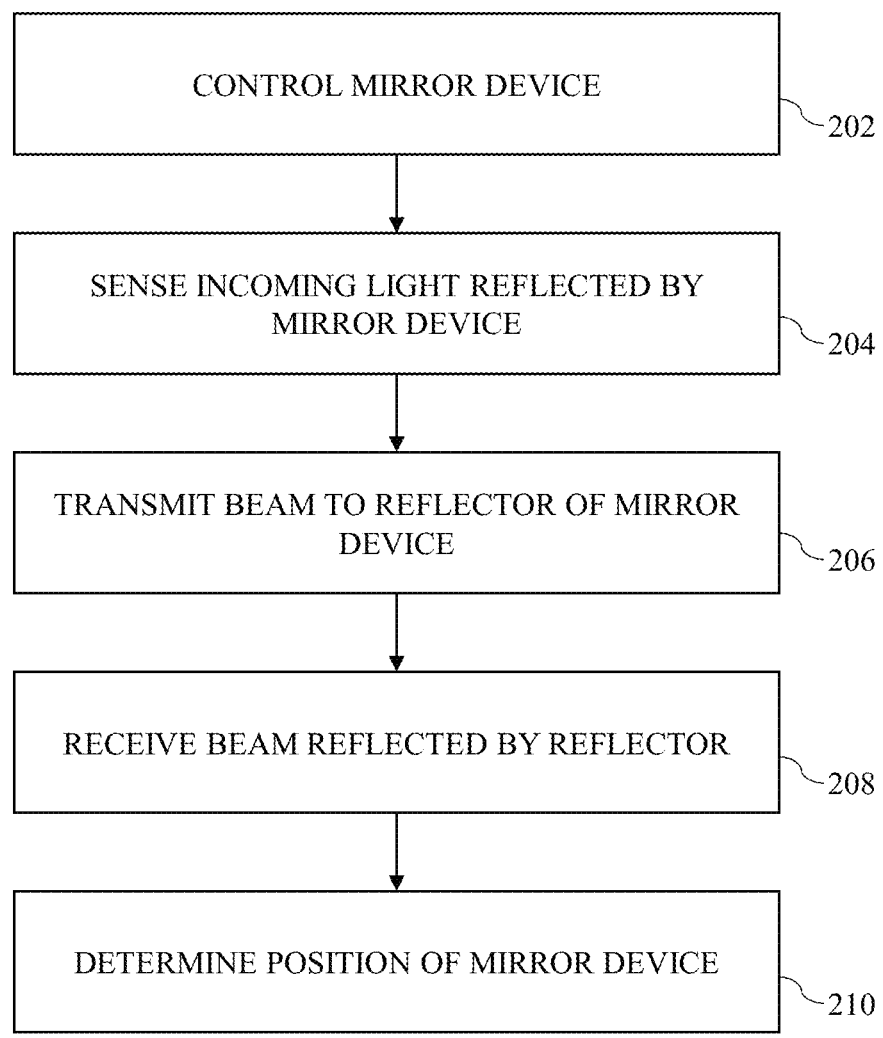
FIG. 12 illustrates a block diagram of a process for managing an optical system having a mirror device, according to one or more implementations of the subject technology.

FIG. 12 illustrates a block diagram of a process 200 for position sensing with a mirror device according to one or more implementations of the subject technology. For explanatory purposes, the process 200 is primarily described herein with reference to the position sensing system 110 of FIGS. 4 and 5. However, the process 200 is not limited to the position sensing system 110, and one or more blocks (or operations) of the process 200 may be performed by one or more other components or circuits. Further for explanatory purposes, the blocks of the process 200 are described herein as occurring in serial, or linearly. However, multiple blocks of the process 200 may occur in parallel. In addition, the blocks of the process 200 need not be performed in the order shown and/or one or more blocks of the process 200 need not be performed and/or can be replaced by other operations.

In operation 202, a mirror device is controlled to have a particular position and/or orientation. It will be understood that the position and/or orientation need not be known, and controlling can include maintaining the mirror device at a particular position or orientation.

In operation 204, incoming light is reflected by the mirror device, and the reflected light is sensed by a sensor 80. Such sensing can include capturing images and/or other information associated with the reflected light. The images or other information can correspond to an object within a line of sight provided by reflection off the mirror device.

In operation 206, a transmit beam is transmitted to a reflector on the mirror device. For example, a transmit beam can be transmitted to a corner cube reflector of the mirror device and/or a flat reflector of the mirror device.

In operation 208, a return beam is received as a reflection of the transmit beam. The return beam can be a reflection off the corner cube retroreflector 130 and/or a reflection off the flat reflector 170 of the mirror device.

In operation 210, the position and/or orientation of the mirror device and/or components thereof can be determined. For example, the return beam can be compared to a local oscillator signal (e.g., with heterodyne mixing) to provide an interferometric measurement, as described herein. Such a measurement can be correlated with a position and/or orientation of the mirror device to determine the same. By further example, the return beam can be measured for its intensity, as described herein. Such a measurement can be correlated with a position and/or orientation of the mirror device to determine the same. Both an interferometric measurement and intensity measurement can be considered to determine the position and/or orientation of the mirror device. For example, the interferometric measurement can be calibrated based on the intensity measurement. Optionally, calibration can occur in a separate step while the mirror device is in a different position and/or orientation. For example, the mirror device can be placed in a position and/or orientation that provides a maximum intensity measurement. Thereafter, movement of the mirror device can be controlled, and additional interferometric measurement can be taken to determine an updated position and/or orientation of the mirror device.

Figure 13:
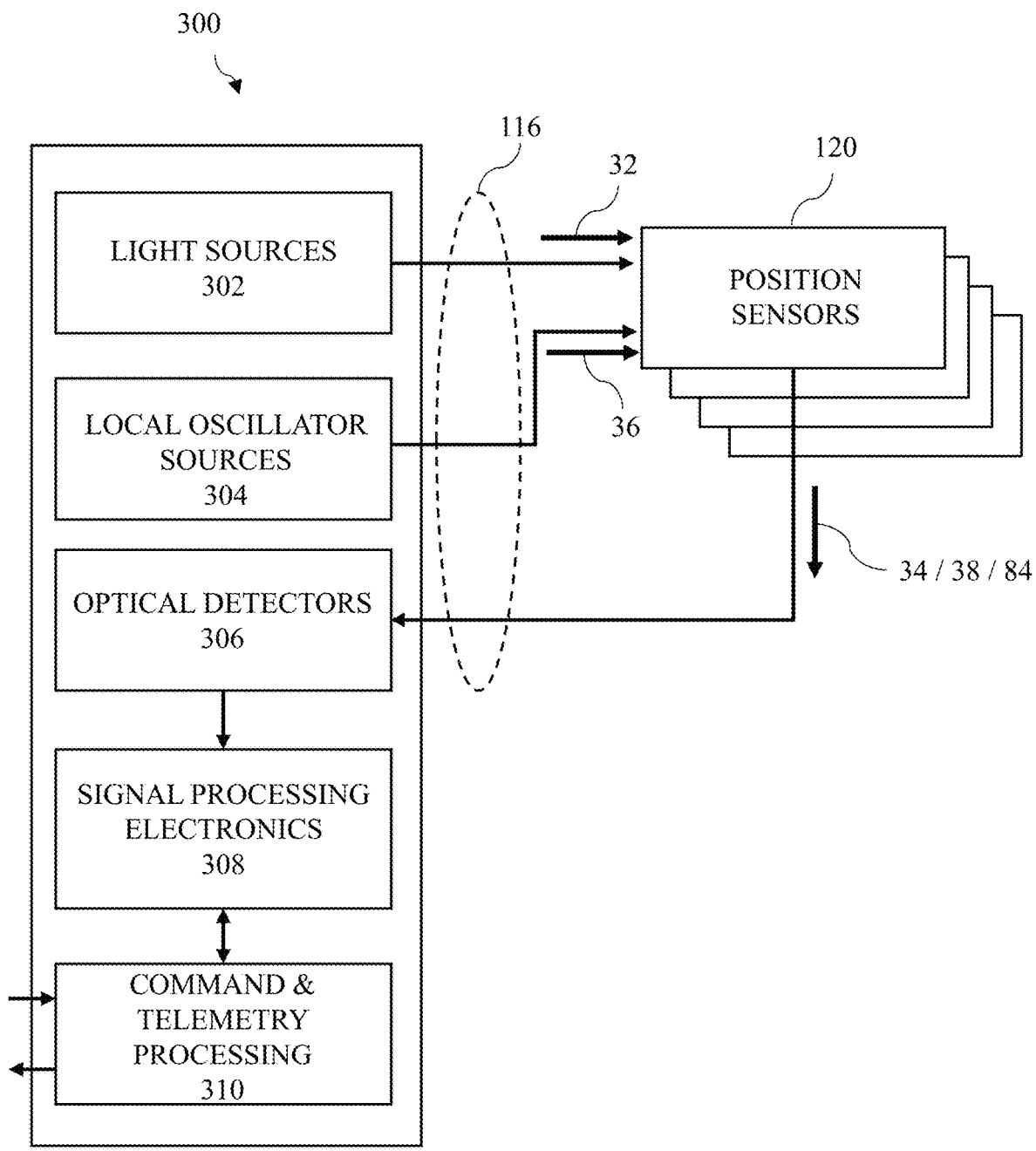
FIG. 13 is a block diagram that illustrates an electro-optical and signal processing system upon which an embodiment of the subject disclosure may be implemented.

FIG. 13 is a block diagram that illustrates a computer and optical-electronic system 300 upon which an embodiment of the subject disclosure may be implemented. The computer and optical-electronic system 300 includes a signal source 302 and a local oscillator source 304 which together may be comprised of one or more lasers or other coherent light sources, optical detectors 306 for converting the return signals from the position sensors 120 to electrical signals, signal processing electronics 308 which converts the electrical signals from the detectors into measurement information, and command and telemetry processing 310 which can which can accept commands requesting measurement information and or timing or synchronization signals from external sources and provide the desired measurement information in a machine readable digital format for display, or use by another computer system or, for digital storage. The computer and optical-electrical system 300 may include one or more processing devices for executing instructions to calculate, track and format measurement information for external sources and may include memory, such as a random access memory ("RAM") or other dynamic storage device, for storing information and instructions to be executed by a processor or processors. Memory may also be used for storing temporary variables or other intermediate information during execution of instructions.

The computer and optical-electronic system 300 may be coupled via command and telemetery processing 310 to a display device (not illustrated), such as a liquid crystal display ("LCD"), a light-emitting diode ("LED") display, or a combination thereof, for displaying information to a computer user. An input device, such as, for example, a keyboard or a mouse may also be coupled to computer and optical-electronic system 300 via command and telemetry processing 310 for communicating information and command selections to one or more processors.

According to one implementation of the subject disclosure, generating and configuring a plurality of input signals 32 and local oscillator signals 36 may be performed by a computer and optical-electronic system 300 in response to executing one or more sequences of one or more instructions contained in memory. Additionally, the computer and optical-electronic system may receive reference signals 34, measurement signals 38, and angle reference signals 84 from position sensors 120. The computer and optical-electronic system 300 may convert these received signals into measurement information by executing one or more sequences of one or more instructions on one or more processors. Such instructions may be read into memory either from an external source via the command and telemetry processing 310 or from an internal machine-readable medium such as an EEPROM. In alternative implementations, hard-wired circuitry may be used in place of or in combination with software instructions to implement various implementations of the subject disclosure. It will be understood that the computer and optical-electronic system may be implemented in one or in multiple devices. Thus, implementations of the subject disclosure are not limited to any specific combination of hardware circuitry and software.

The term "machine-readable medium" as used herein refers to any medium that participates in providing instructions to processor for execution. Such a medium may take many forms, including, but not limited to, non-volatile media, volatile media, and transmission media. Non-volatile media include, for example, optical or magnetic disks, such as data storage device, or Read Only Memory ROM, especially Electrically Erasable and Programmable Read Only Memory, EEPROM. Volatile media include dynamic memory, such as Random Access Memory RAM. Transmission media include coaxial cables, copper wire, and fiber optics. Transmission media can also take the form of acoustic or light waves, such as those generated during radio frequency and infrared data communications.

Various examples of aspects of the disclosure are described below as clauses for convenience. These are provided as examples, and do not limit the subject technology.

Clause A: an optical system comprising: an optical element for receiving incoming light; a sensor; a mirror device configured to reflect the incoming light to the sensor, the mirror device comprising: a plate configured to rotate about a pivot; a mirror surface on a side of the plate; and a reflector coupled to the plate; and a position sensor comprising: a transmit waveguide configured to transmit a beam to the reflector; a receive waveguide configured to receive the beam reflected by the reflector; and a photonic integrated circuit configured to detect the beam received by the receive waveguide.

Clause B: an optical system comprising: a mirror device configured to reflect incoming light to a sensor, the mirror device comprising: a plate configured to rotate about a pivot; a mirror surface on a first side of the plate; a corner cube reflector coupled to a second side of the plate and being configured to reflect a first beam to a position based on a position of the plate; and a flat reflector coupled to the second side of the plate and being configured to reflect a second beam to at an angle based on the position of the plate; a displacement interferometer sensor configured to receive the first beam as reflected by the corner cube reflector; and angle reference sensor configured to receive the second beam as reflected by the corner cube reflector.

Clause C: a method comprising: receiving incoming light; reflecting the incoming light with a mirror surface of a mirror device; detecting the incoming light from the mirror device with a sensor; transmitting a beam to a reflector of the mirror device; reflecting the beam with the reflector; receiving the beam reflected by the reflector; and determining a position of the mirror device based on the reflected beam.

Clause D: A system comprising: a plate configured to rotate in one or more directions about a pivot; one or more retroreflectors coupled to the plate wherein each retroreflector returns light from a source in a direction approximately parallel to a direction of the light from the source; and one or more position sensors not attached to the plate, each of the position sensors comprising: a transmit waveguide and collimating optic configured to transmit a beam to a retroreflector; a receive waveguide and focusing optic configured to receive the beam reflected by a retroreflector over a range of motion of the plate; and a waveguide-based interferometer configured to coherently combine the received beam with a local oscillator signal to generate an interferometric signal.

Claim E: A system comprising: a plate configured to rotate in one or more directions about a pivot; one or more retroreflectors coupled at different locations to the plate; one or more flat reflectors coupled to the plate at locations adjacent to each of the retroreflectors; and one or more position sensors not attached to the plate, each of the position sensors comprising: a first transmit waveguide and collimating optic configured to transmit a first transmit beam to a retroreflector, wherein the first transmit beam is reflected by the retroreflector as a first receive beam; a first receive waveguide and focusing optic configured to receive the first receive beam reflected over a range of motion of the plate; a waveguide-based interferometer configured to coherently combine the first received beam with a local oscillator signal to generate an interferometric signal; a second transmit waveguide and collimating optic configured to transmit a second transmit beam to the flat reflector, wherein the second transmit beam is reflected by the flat reflector as a second receive beam; and a second receive waveguide and focusing optic configured to receive a beam reflected by the flat reflector over a portion of the range of motion of the plate.

One or more of the above clauses can include one or more of the features described below. It is noted that any of the following clauses may be combined in any combination with each other, and placed into a respective independent clause, e.g., Clause A, B, C, D, or E.

Clause 1: the reflector is a corner cube reflector.

Clause 2: the corner cube reflector is configured to reflect the beam in a direction that is parallel to a direction of the beam as transmitted to the corner cube reflector.

Clause 3: the mirror device further comprises a flat reflector coupled to the plate.

Clause 4: the transmit waveguide is a first transmit waveguide; the receive waveguide is a first receive waveguide; the beam is a first beam; the position sensor further comprises: a second transmit waveguide configured to transmit a second beam to the flat reflector; and a second receive waveguide configured to receive the second beam reflected by the flat reflector; and the photonic integrated circuit is further configured to detect the second beam received by the second receive waveguide.

Clause 5: the computer system is further configured to control a position of the mirror device.

Clause 6: the corner cube reflector is configured to reflect the first beam in a direction that is parallel to a direction of the first beam as transmitted to the corner cube reflector.

Clause 7: a computer system configured to determine a position of the mirror device based on the position of the reflected first beam and the angle of the reflected second beam.

Clause 8: a computer system configured to: record an image based on the incoming light detected by the sensor; determine a direction of the incoming light based on the determined position of the mirror device; and record the direction as being associated with the image.

Clause 9: the computer system is further configured to control a position of the mirror device.

Clause 10: the corner cube reflector comprises three mutually orthogonal reflective surfaces facing the displacement interferometer sensor.

Clause 11: determining the position of the mirror device is based on an interferometric measurement of heterodyne mixing of the transmitted beam and the reflected beam.

Clause 12: the reflector is a corner cube reflector; the beam is a first beam; the method further comprises: transmitting a second beam to a flat reflector of the mirror device; reflecting the second beam with the flat reflector; receiving the second beam reflected by the reflector; and determining the position of the mirror device is further based on the reflected second beam.

Clause 13: determining the position of the mirror device is based on an intensity of the reflected second beam.

Clause 14: recording an image based on the incoming light detected by the sensor; determining a direction of the incoming light based on the determined position of the mirror device; and recording the direction as being associated with the image.

Clause 15: the reflector is configured to reflect the beam in a direction that is parallel to a direction of the beam as transmitted to the reflector.

Clause 16: controlling the position of the mirror device.

Clause 17: the pivot about which the plate rotates may translate horizontally and/or vertically with respect to the position sensors.

Clause 18: each waveguide-based interferometer for each position sensor is configured to accept an input signal; and each waveguide-based interferometer is configured to transmit a first portion of the input signal along a transmit waveguide and collimating optic to a retroreflector; each waveguide-based interferometer is configured to accept a local oscillator signal; each waveguide-based interferometer is configured to coherently combine a receive beam collected via the receive waveguide with a first portion of the local oscillator signal to generate an interferometric signal; and each waveguide-based interferometer is configured to send the interferometric signal to a device that detects changes in an intensity of the interferometric signal for determining changes in an optical path length of the transmitted and received beams.

Clause 19: each waveguide-based interferometer for each position sensor is configured to accept either a first input signal or a second input signal; each waveguide-based interferometer is configured to transmit a first portion of either the first or second input signal along a transmit waveguide to a retroreflector; each waveguide-based interferometer is configured to accept either a first local oscillator signal, or a second local oscillator signal; each waveguide-based interferometer is configured to coherently combine the receive beam collected via the receive waveguide with either a first portion of the first local oscillator signal, or a first portion of the second local oscillator signal to generate an interferometric signal; and each waveguide-based interferometer is configured to transmit the interferometric signal to a first or second device or devices that detect changes in the intensity of the interferometric signal for determining changes in the optical path length of the position sensor transmit and receive beams.

Clause 20: each waveguide-based interferometer for each position sensor is configured to divert a second portion of either the first or second input signal along a first waveguide; each waveguide-based interferometer is configured to divert a second portion of either the first or second local oscillator signal along a second waveguide; each waveguide-based interferometer is configured to coherently combine the second portion of the either the first or second input signal with the second portion of either the first or second local oscillator signal to generate a second interferometric signal; and each waveguide-based interferometer is configured to transmit the second interferometric signal to a first and/or second device or devices that detect changes in an intensity of the second interferometric signal for establishing a reference.

Clause 21: a computer and optical-electronic system wherein: a first set of optical detectors convert the first interferometric signal from each position sensor to a first set of electrical signals; a second set of optical detectors convert the second interferometric signal from each position sensor to a second set of electrical signals; and the first and second set of electrical signals are digitized and processed in the computer and optical-electrical system to compute changes in the optical path lengths of the first transmit and first receive beam of each position sensor.

Clause 22: each waveguide-based interferometer is implemented in one or more photonic integrated circuits.

Clause 23: each of the one or more retroreflectors is a corner cube retroreflector, each corner cube retroreflector comprising three orthogonal reflective surfaces that share a common vertex point.

Clause 24: the pivot about which the plate rotates is configured to translate horizontally and/or vertically with respect to the position sensors.

Clause 25: each position sensor is configured to accept either a first or second input signal and a first or second input local oscillator signal; a first portion of the first or second input signal is directed to a first transmit waveguide and collimating optic to form the first transmit beam; a first receive waveguide and focusing optic receives the first receive beam; and a first portion of the first or second input local oscillator signal is coherently combined with the first received beam to form a first interferometric signal; the first interferometric signal is conveyed to a first and/or second device that detects changes in an intensity of the signal for determining changes in an optical path length of the first transmit and first receive beams; a second portion of the first or second input signal is directed to a waveguide; a second portion of the first or second input local oscillator signal is coherently combined with the second portion of the first or second input signal to form a second interferometric signal; the second interferometric signal is conveyed to a first and/or second device that detect changes in an intensity of the second interferometric signal for establishing a reference; a third portion of the first or second input signal is diverted to a second transmit waveguide and collimating optic forming the second transmit beam; and over a portion of the range of motion of the plate, the second receive beam impinges on the focusing optic and is received by the second receive waveguide forming a second received signal; and Clause 26: the second received signal is conveyed to a device that detects changes in an intensity of the second received signal corresponding to changes in the position and orientation of the flat reflector as it moves with the plate.

Clause 27: a computer and optical-electronic system wherein: a first set of optical detectors convert the first interferometric signal from each position sensor to a first set of electrical signals; a second set of optical detectors convert the second interferometric signal from each position sensor to a second set of electrical signals; a third set of optical detectors convert the second receive signal from each position sensor to a third set of electrical signals; the first and second set of electrical signals are digitized and processed in the computer and optical-electrical system to compute changes in the optical path length of the first transmit and first receive beam of each position sensor; the computer and optical-electronic system is configured to store in computer memory changes in the optical path lengths of the first transmit and first receive beam for each position sensor; the third set of electrical signals are digitized and stored in computer memory; the computer and optical-electronic system searches stored values of the third set of electrical signals and performs computations to detect occurrences of peak signal intensity that correspond to a specific plate orientation and position for each position sensor; and the computer and optical-electronic system correlates occurrences of peak signal intensity in the third set of electrical signals with stored values for change in the position sensor transmit and receive optical path length derived from the first and second set of electrical signals.

Clause 28: the second transmit beam and second receive beam of each position sensor share the same optic which both collimates the second transmit beam and focuses the second receive beam to and/or from the second transmit and second receive waveguides, respectively.

Clause 29: each retroreflector and flat reflector coupled to the plate are formed by an optical element comprising: three orthogonal reflective surfaces configured to meet at a common vertex; and a fourth reflective surface that is not parallel to any of the three orthogonal reflective surfaces and is fixed to maintain a position and orientation with respect to the three orthogonal reflective surfaces.

Clause 30: the second transmit beam of each position sensor is formed from a third portion of the first or second input local oscillator signal and not from a third portion of the first or second input signal.

Clause 31: the second transmit beam and second receive beam of each position sensor share the same optic which both collimates the second transmit beam and focuses the second receive beam to and/or from the second transmit and second receive waveguides, respectively.

Clause 32: each retroreflector and flat reflector coupled to the plate are formed by an optical element comprising: three orthogonal reflective surfaces configured to meet at a common vertex; and a fourth reflective surface that is not parallel to any of the three orthogonal reflective surfaces and is fixed to maintain a position and orientation with respect to the three orthogonal reflective surfaces.

Clause 33: each position sensor is further configured to accept a second first or second input signal; and the second transmit beam for each position sensor is formed from the second first or second input signal and not from a third portion of the first or second input signal.

Clause 34: the second transmit beam and second receive beam of each position sensor share the same optic which both collimates the second transmit beam and focuses the second receive beam to and/or from the second transmit and second receive waveguides, respectively.

Clause 35: each retroreflector and flat reflector coupled to the plate are formed by an optical element comprising: three orthogonal reflective surfaces configured to meet at a common vertex; and a fourth reflective surface that is not parallel to any of the three orthogonal reflective surfaces and is fixed to maintain a position and orientation with respect to the three orthogonal reflective surfaces.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A system comprising:
   a plate configured to rotate in one or more directions about a pivot;
   a retroreflector coupled to the plate; and
   one or more position sensors, each of the position sensors comprising:
   a transmit waveguide configured to provide a transmit beam to the retroreflector;
   a receive waveguide configured to receive the transmit beam reflected by the retroreflector over a range of motion of the plate, wherein for a range of positions of the retroreflector based on rotation of the plate, the transmit beam reflected by the retroreflector is approximately parallel to the transmit beam transmitted by the transmit waveguide to the retroreflector; and
   an interferometer configured to coherently combine the received transmit beam with a local oscillator signal to generate a first interferometric signal.

2. The system of claim 1 wherein the pivot about which the plate rotates translates horizontally and/or vertically with respect to the one or more position sensors.

3. The system of claim 2 wherein the interferometer is further configured to:
   accept an input signal;
   transmit a first portion of the input signal along the transmit waveguide to the retroreflector;
   accept the local oscillator signal; and
   perform an interferometric measurement to measure an intensity of the first interferometric signal, wherein an orientation of the plate is based on the intensity.

4. The system of claim 1, wherein the interferometer is further configured to:
   accept either a first input signal or a second input signal;
   transmit a first portion of either the first or second input signal along the transmit waveguide to the retroreflector;
   accept either a first local oscillator signal, or a second local oscillator signal; and
   perform an interferometric measurement to measure an intensity of the first interferometric signal, wherein an orientation of the plate is based on the intensity.

5. The system of claim 4, wherein the interferometer is further configured to:
   divert a second portion of either the first or second input signal along the transmit waveguide;
   divert a second portion of either the first or second local oscillator signal along the receive waveguide;
   each waveguide-based interferometer is configured to coherently combine the second portion of the either the first or second input signal with the second portion of either the first or second local oscillator signal to generate a second interferometric signal; and
   interferometer is configured to transmit use the second interferometric signal to detect intensity for establishing a reference.

6. The system of claim 5, further comprising:
   a first set of optical detectors configured to convert the first interferometric signal from each of the one or more position sensors to a first set of electrical signals;
   a second set of optical detectors configured to convert the second interferometric signal from each of the one or more position sensors to a second set of electrical signals; and
   a computer and optical-electrical system configured to digitize and process the first and second set of electrical signals to compute changes in optical path lengths of respective transmit beams from the transmit waveguide and the receive waveguide.

7. The system of claim 1 wherein each waveguide based the interferometer is implemented in one or more photonic integrated circuits.

8. The system of claim 7 wherein each of the retroreflector comprises a corner cube retroreflector comprising three orthogonal reflective surfaces that share a common vertex point.

9. A system comprising:
   a plate configured to rotate in one or more directions about a pivot;
   one or more retroreflectors coupled at different locations to the plate;
   one or more flat reflectors coupled to the plate at locations adjacent to each of the retroreflectors; and
   one or more position sensors not attached to the plate, each of the position sensors comprising:
   a first transmit waveguide and collimating optic configured to transmit a first transmit beam to a retroreflector, wherein the first transmit beam is reflected by the retroreflector as a first receive beam;
   a first receive waveguide and focusing optic configured to receive the first receive beam reflected over a range of motion of the plate;
   a waveguide-based interferometer configured to coherently combine the first received beam with a local oscillator signal to generate an interferometric signal;
   a second transmit waveguide and collimating optic configured to transmit a second transmit beam to the flat reflector, wherein the second transmit beam is reflected by the flat reflector as a second receive beam; and
   a second receive waveguide and focusing optic configured to receive a beam reflected by the flat reflector over a portion of the range of motion of the plate.

10. The system of claim 9, wherein the pivot about which the plate rotates is configured to translate horizontally and/or vertically with respect to the position sensors.

11. The system of claim 10, wherein:
each position sensor is configured to accept either a first or second input signal and a first or second input local oscillator signal;
a first portion of the first or second input signal is directed to a first transmit waveguide and collimating optic to form the first transmit beam;
a first receive waveguide and focusing optic receives the first receive beam; and
a first portion of the first or second input local oscillator signal is coherently combined with the first received beam to form a first interferometric signal;
the first interferometric signal is conveyed to a first and/or second device that detects changes in an intensity of the first interferometric signal for determining changes in an optical path length of the first transmit waveguide and first receive beams;
a second portion of the first or second input signal is directed to a waveguide;
a second portion of the first or second input local oscillator signal is coherently combined with the second portion of the first or second input signal to form a second interferometric signal;
the second interferometric signal is conveyed to a first and/or second device that detect changes in an intensity of the second interferometric signal for establishing a reference;
a third portion of the first or second input signal is diverted to a second transmit waveguide and collimating optic forming the second transmit beam; and
over a portion of the range of motion of the plate, the second receive beam impinges on the focusing optic and is received by the second receive waveguide forming a second received signal; and
the second received signal is conveyed to a device that detects changes in an intensity of the second received signal corresponding to changes in the position and orientation of the flat reflector as it moves with the plate.

12. The system of claim 11, wherein the second transmit beam of each position sensor is formed from a third portion of the first or second input local oscillator signal and not from a third portion of the first or second input signal.

13. The system of claim 12, wherein the second transmit beam and second receive beam of each position sensor share the same optic which both collimates the second transmit beam and focuses the second receive beam to and/or from the second transmit and second receive waveguides, respectively.

14. The system of claim 13, wherein each retroreflector and flat reflector coupled to the plate are formed by an optical element comprising:
three orthogonal reflective surfaces configured to meet at a common vertex; and
a fourth reflective surface that is not parallel to any of the three orthogonal reflective surfaces and is fixed to maintain a position and orientation with respect to the three orthogonal reflective surfaces.

15. The system of claim 11, further comprising:
a first set of optical detectors configured to convert a first interferometric signal from each position sensor to a first set of electrical signals;
a second set of optical detectors configured to convert a second interferometric signal from each position sensor to a second set of electrical signals;
a third set of optical detectors convert the second receive signal from each position sensor to a third set of electrical signals;
a computer and optical-electrical system configured to:
digitize and process the first and second set of electrical signals to compute changes in the optical path length of a first transmit beam and a first receive beam of each position sensor;
store in computer memory changes in the optical path lengths of the first transmit and first receive beam for each position sensor;
digitize and store the third set of electrical signals in computer memory;
search stored values of the third set of electrical signals and performs computations to detect occurrences of peak signal intensity that correspond to a specific plate orientation and position for each position sensor; and
correlate occurrences of peak signal intensity in the third set of electrical signals with stored values for change in the position sensor transmit and receive optical path length derived from the first and second set of electrical signals.

16. The system of claim 15, wherein:
each position sensor is further configured to accept a second first or second input signal; and
the second transmit beam for each position sensor is formed from the second first or second input signal and not from a third portion of the first or second input signal.

17. The system of claim 9, wherein the second transmit beam and second receive beam of each position sensor share the same optic which both collimates the second transmit beam and focuses the second receive beam to and/or from the second transmit and second receive waveguides, respectively.

18. The system of claim 9, wherein each retroreflector and flat reflector coupled to the plate are formed by an optical element comprising:
three orthogonal reflective surfaces configured to meet at a common vertex; and
a fourth reflective surface that is not parallel to any of the three orthogonal reflective surfaces and is fixed to maintain a position and orientation with respect to the three orthogonal reflective surfaces.

19. The system of claim 9, further comprising a reflective surface, wherein:
the reflective surface is located on a first surface of the plate, and
the one or more retroreflectors and the one or more flat reflectors are located on a second surface of the plate.

20. The system of claim 19, further comprising a pivot between the first surface and the second surface.

* * * * *